(12) United States Patent
Johnson et al.

(10) Patent No.: US 7,590,404 B1
(45) Date of Patent: Sep. 15, 2009

(54) SURFACE WAVE COMMUNICATIONS BETWEEN A REMOTE ANTENNA AND A BASE STATION THAT IS CO-LOCATED WITH ANOTHER BASE STATION

(75) Inventors: Harold W. Johnson, Roach, MO (US); Timothy D. Euler, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 656 days.

(21) Appl. No.: 11/132,003

(22) Filed: May 18, 2005

(51) Int. Cl.
*H04M 9/00* (2006.01)
*G04B 11/01* (2006.01)

(52) U.S. Cl. ......... 455/402; 455/403; 455/39; 455/523

(58) Field of Classification Search ......... 455/402, 455/403, 39, 41.1, 41.2, 523, 442; 370/463; 375/218, 220; 340/310.11, 538
See application file for complete search history.

(56) References Cited

U.S. PATENT DOCUMENTS

| | | | |
|---|---|---|---|
| 4,032,845 A * | 6/1977 | Via | 455/39 |
| 6,785,558 B1 | 8/2004 | Stratford et al. | |
| 6,985,714 B2 * | 1/2006 | Akiyama et al. | 455/402 |
| 7,095,957 B1 | 8/2006 | Britz et al. | |
| 7,280,033 B2 * | 10/2007 | Berkman et al. | 340/310.16 |
| 2002/0187809 A1 | 12/2002 | Mani et al. | |
| 2003/0053484 A1 | 3/2003 | Sorenson et al. | |
| 2004/0153701 A1 * | 8/2004 | Pickell | 714/4 |
| 2005/0111533 A1 | 5/2005 | Berkman et al. | |
| 2006/0172775 A1 * | 8/2006 | Conyers et al. | 455/561 |

OTHER PUBLICATIONS

U.S. Appl. No. 11/049,120, filed Feb. 1, 2005.
U.S. Appl. No. 10/951,201, filed Sep. 27, 2004.

* cited by examiner

*Primary Examiner*—Melur Ramakrishnaiah

(57) ABSTRACT

At a first site, a first antenna exchanges first communications with wireless devices, and exchanges the first communications with a first base station. The first base station exchanges the first communications with a service node. At a second site, a second antenna exchanges second communications with other wireless devices, and exchanges the second communications with a first surface wave interface. The first surface wave interface exchanges the second communications with a second surface wave interface at the first site. The second surface wave interface exchanges the second communications with a second base station at the first site. The second base station exchanges the second communications with the service node. The service node processes the first and second communications to provide a communication service to the wireless devices.

20 Claims, 4 Drawing Sheets

SURFACE WAVE COMMUNICATIONS BETWEEN A REMOTE ANTENNA AND A BASE STATION THAT IS CO-LOCATED WITH ANOTHER BASE STATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communications between antennas, base stations, and service nodes.

2. Description of the Prior Art

FIG. 1 illustrates communication system 100 in an example of the prior art. Communication system 100 includes antenna 103, base station 104, and service node 105. Both antenna 103 and base station 104 are located at the same site 106. In most cases, site 106 represents an elevated structure, such as a building or tower.

Antenna 103 exchanges user communications in a wireless communication format with wireless communication devices 101-102 over wireless communication links 111-112. The wireless communication format could be Code Division Multiple Access (CDMA), Global System for Mobile Communications (GSM), or some other wireless communication format. Thus, site 106 (antenna 103 and base station 104) provides wireless communication service to devices within an area defined by cell 107.

Antenna 103 exchanges the user communications with base station 104 over communication link 113. Communication link 113 is typically a relatively short metallic connection. Base station 104 exchanges the user communications with service node 105 over communication link 114. Communication link 114 is typically a Time Division Multiplex (TDM) connection, such as a T1 or DS3. Service node 105 processes the user communications to provide a communication service, such as telephony or Internet access, to wireless communication devices 101-102.

As the demand for wireless communications increases, antenna 103 and base station 104 eventually do not have the capacity to serve all potential users. To add capacity, cell 107 is split into two cells, where antenna 103 and base station 104 serve one split cell, and a new antenna and base station are installed at a new site to serve the other split cell. FIG. 2 illustrates the resulting spilt-cell communication system.

FIG. 2 illustrates communication system 200 in an example of the prior art. Communication system 200 includes antennas 103 and 203, base stations 104 and 204, and service node 105. Note that former cell 107 (See FIG. 1) has been split into two cells 207 and 208. Existing site 106 retains existing antenna 103 and existing base station 104 to serve new cell 207. New site 206 includes new antenna 203 and new base station 204 to serve new cell 208. In most cases, sites 106 and 206 represent elevated structures, such as buildings or towers.

Existing antenna 103 exchanges first user communications in a wireless communication format with wireless communication device 101 over wireless communication link 111. Existing antenna 103 exchanges the first user communications with existing base station 104 over existing communication link 113. Existing base station 104 exchanges the first user communications with existing service node 105 over existing communication link 114. Existing service node 105 processes the first user communications to provide the communication service to wireless communication device 101.

New antenna 203 exchanges second user communications in a wireless communication format with wireless communication device 102 over wireless communication link 211. New antenna 203 exchanges the second user communications with new base station 204 over new communication link 213. New base station 204 exchanges the second user communications with existing service node 105 over new communication link 214. Existing service node 105 processes the user second communications to provide the communication service to wireless communication device 102.

New cell 208 requires a new site 206 to house new antenna 203 and new base station 204. Thus, new site 206 must have enough space to accommodate both new antenna 203 and new base station 204. Since new site 206 is typically on an elevated structure, the elevated structure must have enough space to accommodate both new antenna 203 and new base station 204.

Unfortunately, an elevated structure that is properly located to serve cell 208 and that has enough space for a new antenna and base station may be hard to find and may be very expensive. In addition, new communication link 214 is required from new site 206 to service node 105, and new communication link 214 is typically an expensive TDM link. Thus, new site 206 may be very difficult or impossible to find, and new site 206 may become prohibitively expensive to implement.

Surface wave transmission systems have become available from suppliers, such as Coridor. Surface wave transmissions are guided microwave radio frequencies from approximately 800 MHz to 10 GHz whose properties enable their propagation as guided waves following a conductor path. In a surface wave transmission system, a first surface wave interface exchanges communication signals with a second surface wave interface over an electrical power line—possibly the power line neutral or a powered alternating current distribution line. The communication signals are transferred in the form of an electromagnetic wave that propagates externally to and around the surface of the power line as a guided Radio Frequency (RF) wave. In some cases, surface wave transceivers are doughnut-shaped around the power line, and they propagate doughnut-shaped electromagnetic waves around and along the external surface of the power line. Unfortunately, surface wave technology has not been effectively implemented to alleviate the split cell problem described above.

SUMMARY OF THE INVENTION

Examples of the invention include a communication system that comprises the following. A first antenna located at a first site is configured to exchange first user communications with first wireless communication devices in a wireless communication format and to exchange the first user communications over a first communication link. A first base station located at the first site is configured to exchange the first user communications with the first antenna over the first communication link and to exchange the first user communications over a second communication link. A service node is configured to exchange the first user communications with the first base station over the second communication link and to process the first user communications to provide a communication service to the first wireless communication devices. A second antenna is located at a second site and is configured to exchange second user communications with second wireless communication devices in the wireless communication format and to exchange the second user communications over a third communication link. A first surface wave communication interface is located at the second site and is configured to exchange the second user communications with the second antenna over the third communication link and to exchange the second user communications over a fourth communication link that comprises a surface wave communication link that transmits communication signals external to and around the surface of an electrical power line. A second surface wave communication interface is located at the first site and is configured to exchange the second user communications with the first surface wave interface over the surface wave communication link and to exchange the second user communications over a fifth communication link. A second base station is located at the first site and is configured to exchange the second user communications with the second surface wave communication interface over the fifth communication link and to exchange the second user communications over the second communication link or a sixth communication link. The service node is configured to exchange the second user communications with the second base station over the second communication link or the sixth communication link and to process the second user communications to provide the communication service to the second wireless communication devices.

In the context of the invention, the term "the second communication link or the sixth communication link" means one link or the other but not both, and both links do not need to exist. In the context of the invention, the terms "first" and "second" etc. distinguish different elements and do not indicate sequence. In the context of the invention, a "communication link" can be comprised of multiple communication links and other communication components.

In some examples of the invention, the communication system includes a cross connect device that forms a portion of the second communication link and that is configured to couple the second base station to the second communication link to aggregate the first user communications and the second user communications on the second communication link.

In some examples of the invention, the communication system includes a cross connect device that forms a portion of the second communication link and the sixth communication link and that is configured to couple the first base station to the sixth communication link to aggregate the first user communications and the second user communications on the sixth communication link.

In some examples of the invention, the communication system includes a cross connect device that forms a portion of the second communication link and the sixth communication link and that is configured to couple the first base station to the sixth communication link if the second communication link experiences a fault.

In some examples of the invention, the communication system includes a cross connect device that forms a portion of the second communication link and the sixth communication link and that is configured to couple the second base station to the second communication link if the sixth communication link experiences a fault.

In some examples of the invention, the power line is a neutral line or a powered alternating current distribution line.

In some examples of the invention, the service node comprises a mobile switching center.

In some examples of the invention, the first antenna serves a first cell including the first wireless devices and the second antenna serves a second cell including the second wireless devices.

In some examples of the invention, the first base station and the second base station share a same elevated structure.

In some examples of the invention, the second site does not include the first base station, does not include the second base station, and does not include other base stations.

Examples of the invention include a method of operating a communication system. The method comprises: exchanging first user communications in a wireless communication format between first wireless communication devices and a first antenna located at a first site; exchanging the first user communications between the first antenna and a first base station located at the first site; exchanging the first user communications between the first base station and a service node; processing the first user communications in the service node to provide a communication service to the first wireless communication devices; exchanging second user communications in the wireless communication format between second wireless communication devices and a second antenna located at a second site; exchanging the second user communications between the second antenna and a first surface wave communication interface located at the second site; exchanging the second user communications over a surface wave communication link between the first surface wave communication interface at the second site and a second surface wave communication interface located at the first site, wherein the surface wave communication link transports the second user communications in communication signals external to and along the surface of an electrical power line; exchanging the second user communications between the second surface wave communication interface at the first site and a second base station located at the first site; exchanging the second user communications between the second base station and the service node; and processing the second user communications in the service node to provide the communication service to the second wireless communication devices.

In some examples of the invention, the method includes, at the first site, aggregating the first user communications and the second user communications onto a same communication link between the first site and the service node.

In some examples of the invention, the method includes, at the first site, de-coupling the first base station from a faulty communication link to the service node and coupling the first base station to an operating communication link to the service node.

In some examples of the invention, the method includes, at the first site, de-coupling the second base station from a faulty communication link to the service node and coupling the second base station to an operating communication link to the service node.

In some examples of the invention, the method includes, at the first site, de-coupling one of the base stations from a faulty communication link to the service node and coupling the one base station to an operating communication link used by the other base station to communicate with the service node.

BRIEF DESCRIPTION OF THE DRAWINGS

The same reference number represents the same element on all drawings.

DETAILED DESCRIPTION OF THE PREFERRED EMBODIMENT

The following description and associated figures depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Example #1

Figure 1:
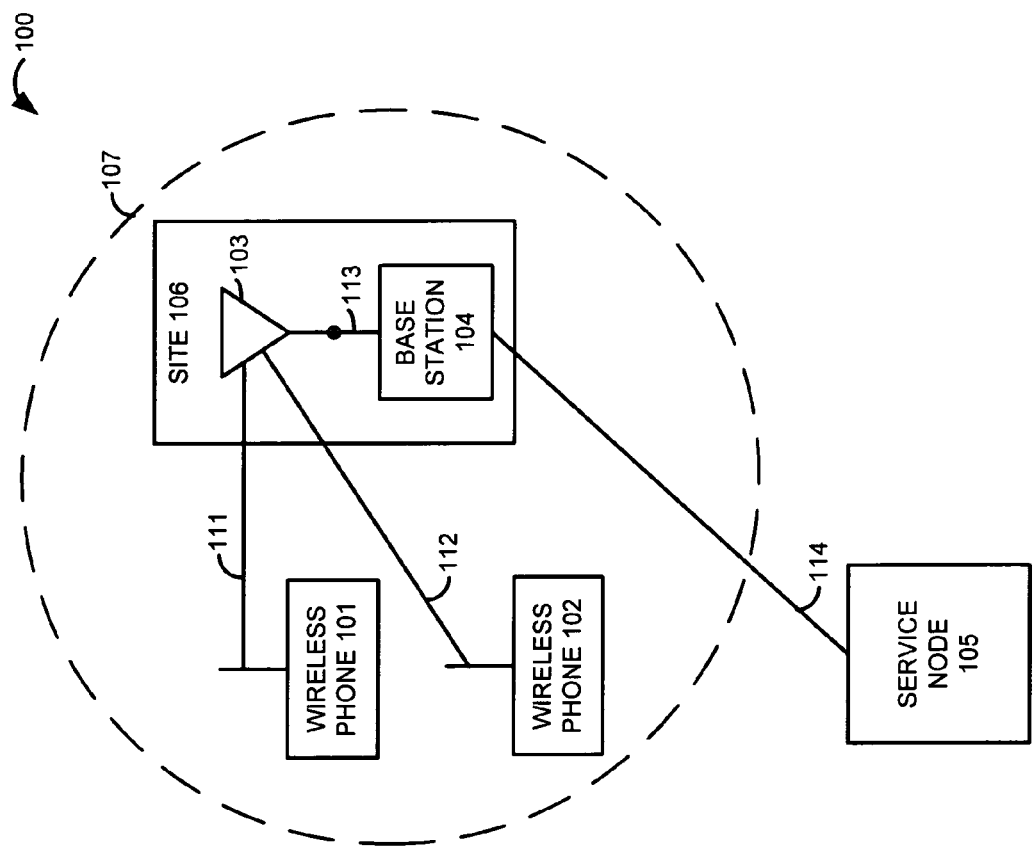
FIG. 1 illustrates communication system 100 in an example of the prior art.
Figure 2:
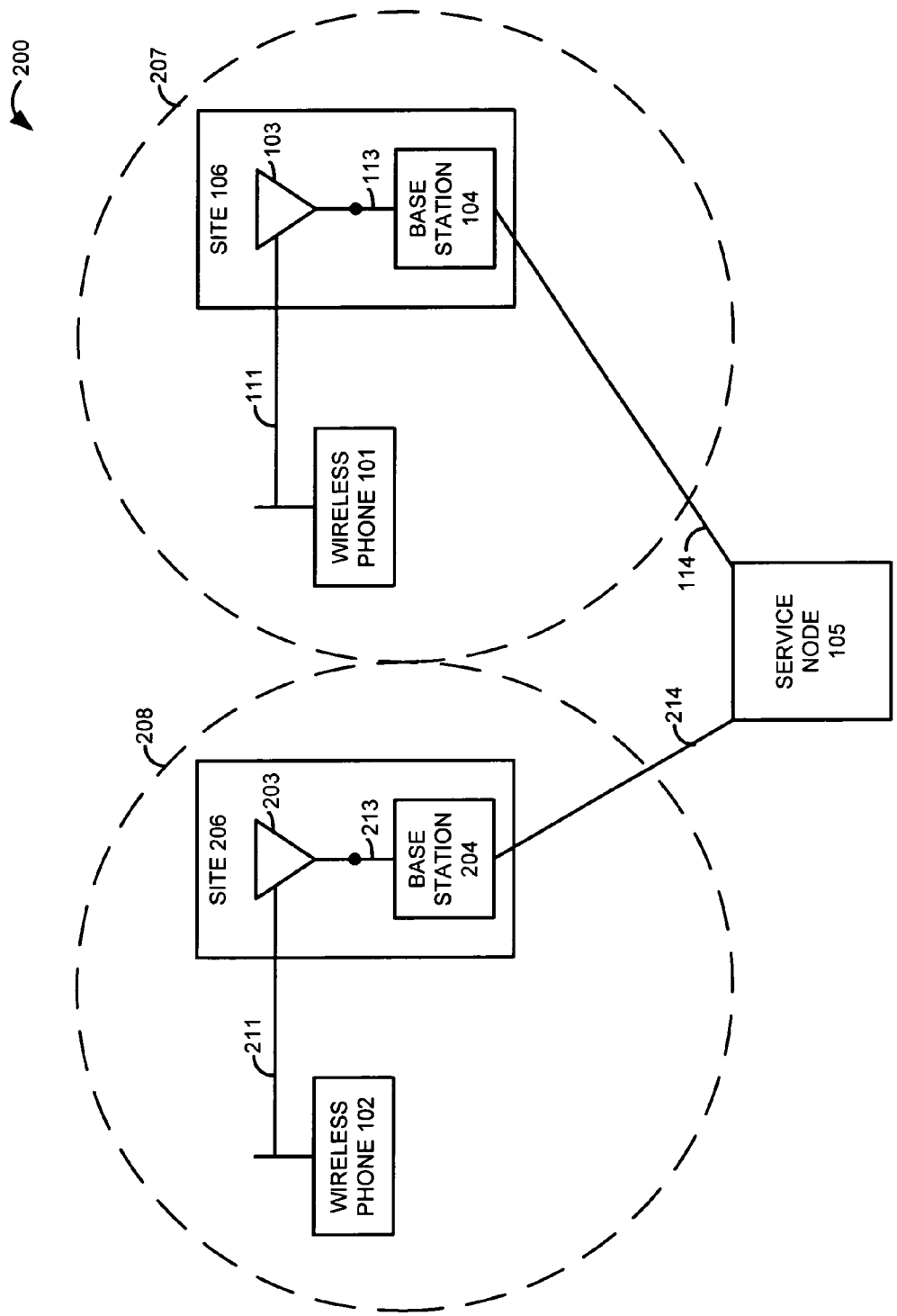
FIG. 2 illustrates communication system 200 in an example of the prior art.
Figure 3:
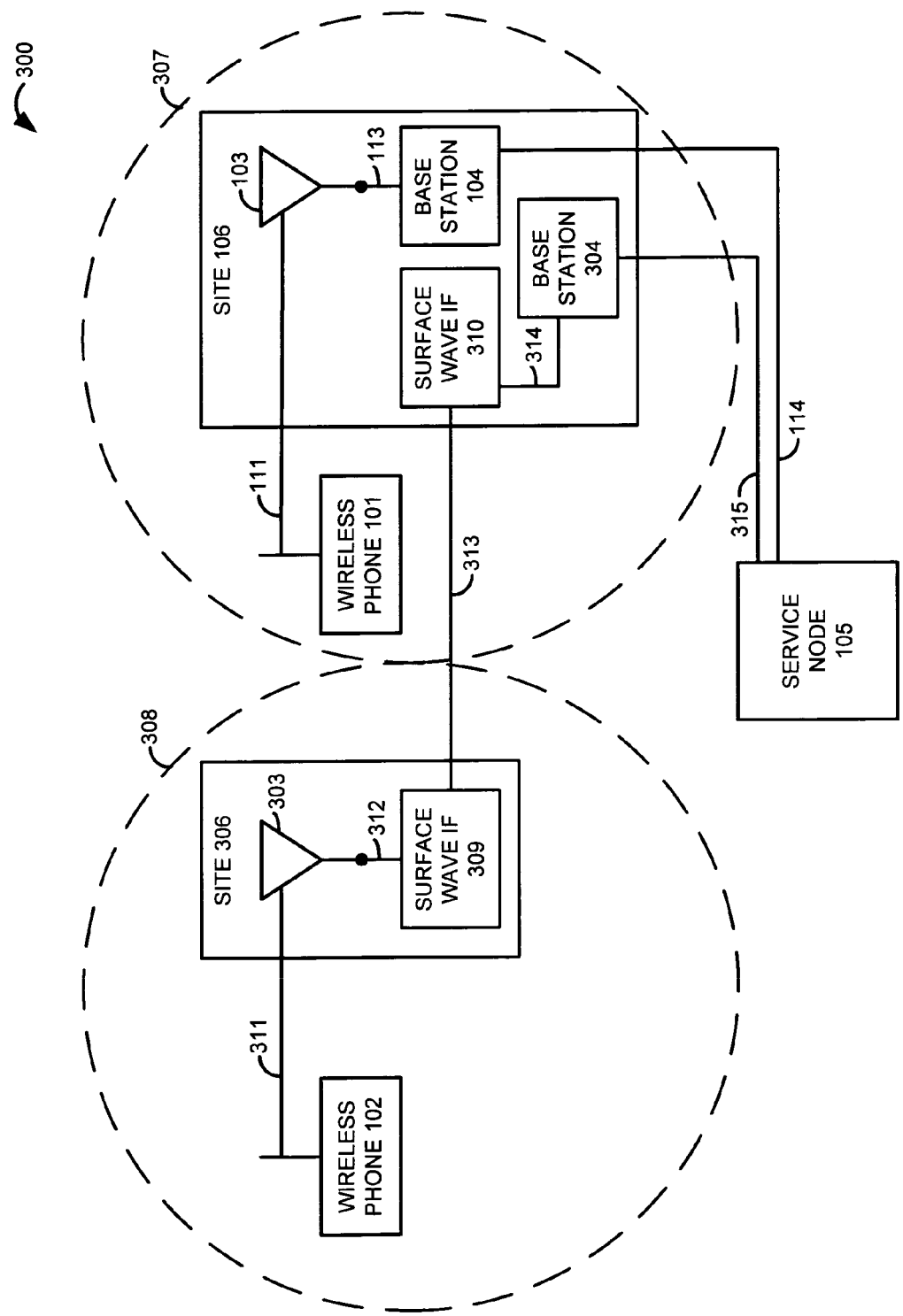
FIG. 3 illustrates communication system 300 in an example of the invention.

FIG. 3 illustrates communication system 300 in an example of the invention. Communication system 300 includes antennas 103 and 303, base stations 104 and 304, service node 105, and surface wave interfaces 309-310. Note that former cell 107 (See FIG. 1) has been split into two cells 307 and 308. Existing site 106 retains existing antenna 103 and existing base station 104 to serve new cell 307. New site 306 includes new antenna 303 and new surface wave interface 309 to serve new cell 308.

Note that new base station 304 and new surface wave interface 310 are located at existing site 106 and not at new site 306. Thus, base stations 104 and 304 are co-located at site 106. In some variations, sites 106 and 306 represent elevated structures, such as buildings or towers. In addition, sites 106 and 306 represent different locations that do not overlap.

At site 106, antenna 103 exchanges first user communications in a wireless communication format with wireless communication device 101 over wireless communication link 111. The wireless communication format could be CDMA, GSM, or some other wireless communication format. Antenna 103 exchanges the first user communications with base station 104 over communication link 113. Communication link 113 is typically a relatively short metallic connection. Base station 104 exchanges the first user communications with service node 105 over communication link 114. Communication link 114 is typically a TDM connection, such as a T1 or DS3. Service node 105 processes the first user communications to provide a communication service, such as telephony or Internet access, to wireless communication device 101. In some variations, service node 105 comprises a mobile switching center.

At site 306, antenna 303 exchanges second user communications in a wireless communication format with wireless communication device 102 over wireless communication link 311. The wireless communication format could be CDMA, GSM, or some other wireless communication format. Antenna 303 exchanges the second user communications with surface wave interface 309 over communication link 312. Communication link 312 is typically a relatively short metallic connection.

Surface wave interface 309 at site 306 exchanges the second user communications over communication link 313 with surface wave interface 310 at site 106. Communication link 313 is a surface wave transmission link. In surface wave transmission, surface wave interfaces 309-310 exchange surface wave communication signals over an electrical power line—possibly the power line neutral or a powered alternating current distribution line. The communication signals transport the second user communications in the form of an electromagnetic wave that propagates externally to and around the surface of the power line as a guided RF wave. In some variations, surface wave transceivers are doughnut-shaped around the power line, and they propagate doughnut-shaped electromagnetic waves around and along the external surface of the power line.

At site 106, surface wave interface 310 exchanges the second user communications with base station 304 over communication link 314. Communication link 314 is typically a relatively short metallic connection. Base station 304 exchanges the second user communications with service node 105 over communication link 315. Communication link 315 is typically a TDM connection, such as a T1 or DS3. Service node 105 processes the second user communications to provide the communication service to wireless communication device 102.

Note that wireless communication devices in cell 307 are served by antenna 103 and base station 104 at site 106. However, wireless communication devices in cell 308 are served by antenna 303 and surface wave interface 309 at site 306, and by surface wave interface 310 and base station 304 at site 106. Also note that communication system 300 is shown on FIG. 3 as being adapted from communication system 100 in a split cell scenario, but communication system 300 could be implemented in other scenarios—including scenarios where no cell is split, and cells 307-308 are implemented as a part of a common design.

Example #4

Figure 4:
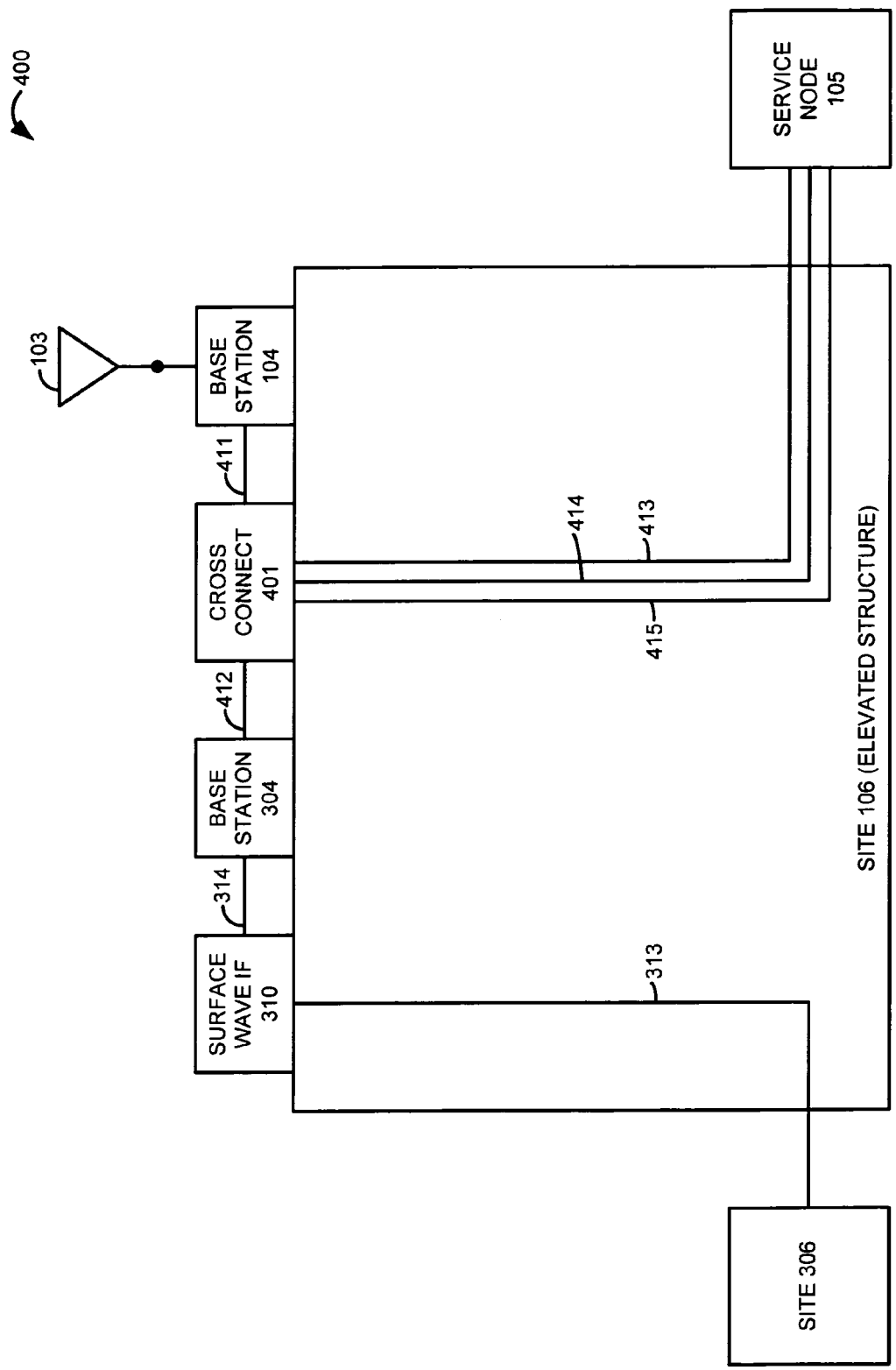
FIG. 4 illustrates communication system 400 in an example of the invention.

FIG. 4 illustrates communication system 400 in an example of the invention. Communication system 400 is a variation of communication system 300 that includes service node 105 and sites 106 and 306. Site 306 is configured and operates as described for site 306 in communication system 300. Aside from communications with service node 105, site 106 is configured and operates as described for site 106 in communication system 300. Site 106 is depicted as an elevated structure in communication system 400 (although an elevated structure is not required in all examples). Note that base stations 104 and 304 are co-located the same elevated structure represented by site 106.

Communication system 104 includes cross-connect device 401. Cross-connect device 401 is coupled to communication link 411 that is coupled to base station 104. Cross-connect device 401 is coupled to communication link 412 that is coupled to base station 304. Cross-connect device 401 is coupled to communication links 413-415 that are coupled to service node 105. Base station 104 exchanges the first user communications with communication link 411, and base station 304 exchanges the second user communications with communication link 412. Cross-connect 401 allows for multiple variations in the communications between service node 105 and co-located base stations 104 and 304.

In one scenario, cross-connect device 401 couples both communication links 411-412 to communication link 413. Base stations 104 and 304 communicate with service node 105 over the same communication link formed by links 411-

413 and cross-connect device 401. Thus, cross-connect device 401 effectively couples both base stations 104 and 304 to communication link 413 to aggregate the first and second user communications onto the same communication link for improved efficiency. In this scenario, communication link 414 could be omitted to save cost if desired.

In another scenario, cross-connect device 401 couples communication link 411 to communication link 413 and couples communication link 412 to communication link 414. Base station 104 communicates with service node 105 over a communication link formed by cross-connect device 401 and links 411 and 413. Base station 304 communicates with service node 105 over a communication link formed by cross-connect device 401 and links 412 and 414. Thus, cross-connect device 401 effectively couples base stations 104 and 304 to separate communication links.

In the above scenario, one of the communication links 413-414 may experience a fault. If communication link 413 experiences the fault, then cross-connect device 401 de-couples link 411 from faulty link 413, and couples link 411 to link 414. Thus, cross-connect device 401 effectively couples both base stations 104 and 304 to communication link 414 to aggregate the first and second user communications onto the same communication link for improved fault tolerance. If communication link 414 experiences the fault, then cross-connect device 401 de-couples link 412 from faulty link 414, and couples link 412 to link 413. Thus, cross-connect device 401 effectively couples both base stations 104 and 304 to communication link 413 to aggregate the first and second user communications onto the same communication link for improved fault tolerance.

In the above scenario, one of the communication links 413-414 may experience a fault. If communication link 413 experiences the fault, then cross-connect device 401 de-couples link 411 from faulty link 413, and couples link 411 to link 415. If communication link 414 experiences the fault, then cross-connect device 401 de-couples link 412 from faulty link 414, and couples link 412 to link 415. Thus, cross-connect device 401 effectively couples both base stations 104 and 304 to communication link 415 in the event of a fault, so both base stations 104 and 304 may share a common back-up link. A shared back-up link is more efficient than dedicated back-up links, and typically provides acceptable fault tolerance.

ADVANTAGES

Referring to FIG. 3, site 306 does not include a base station. Surface wave interface 309 is typically much smaller than a base station, so site 306 can be much smaller than if a base station were present at site 306. Since site 306 can be much smaller, it will be easier and cheaper to find a suitable site, especially on an elevated structure. In addition, base station 304 is located at existing site 106 to provide for more efficient use of that space. The co-location of the base stations and the cross-connect device allow for traffic aggregation to save cost. The co-location of the base stations and the cross-connect device also allow for link sharing to improve fault tolerance.

The invention claimed is:

1. A communication system comprising:
  a first antenna located at a first site and configured to exchange first user communications with first wireless communication devices in a wireless communication format and to exchange the first user communications over a first communication link;
  a first base station located at the first site and configured to exchange the first user communications with the first antenna over the first communication link and to exchange the first user communications over a second communication link;
  a service node configured to exchange the first user communications with the first base station over the second communication link and to process the first user communications to provide a communication service to the first wireless communication devices;
  a second antenna located at a second site and configured to exchange second user communications with second wireless communication devices in the wireless communication format and to exchange the second user communications over a third communication link;
  a first surface wave communication interface located at the second site and configured to exchange the second user communications with the second antenna over the third communication link and to exchange the second user communications over a fourth communication link that comprises a surface wave communication link that transmits communication signals external to and around the surface of an electrical power line as a guided Radio Frequency (RF) wave;
  a second surface wave communication interface located at the first site and configured to exchange the second user communications with the first surface wave interface over the surface wave communication link and to exchange the second user communications over a fifth communication link;
  a second base station located at the first site and configured to exchange the second user communications with the second surface wave communication interface over the fifth communication link and to exchange the second user communications over the second communication link or a sixth communication link; and wherein
  the service node is configured to exchange the second user communications with the second base station over the second communication link or the sixth communication link and to process the second user communications to provide the communication service to the second wireless communication devices.

2. The communication system of claim 1 further comprising a cross connect device that forms a portion of the second communication link and that is configured to couple the second base station to the second communication link to aggregate the first user communications and the second user communications on the second communication link.

3. The communication system of claim 1 further comprising a cross connect device that forms a portion of the second communication link and the sixth communication link and that is configured to couple the first base station to the sixth communication link to aggregate the first user communications and the second user communications on the sixth communication link.

4. The communication system of claim 1 further comprising a cross connect device that forms a portion of the second communication link and the sixth communication link and that is configured to couple the first base station to the sixth communication link if the second communication link experiences a fault.

5. The communication system of claim 1 further comprising a cross connect device that forms a portion of the second communication link and the sixth communication link and that is configured to couple the second base station to the second communication link if the sixth communication link experiences a fault.

6. The communication system of claim 1 wherein the power line comprises at least one of a neutral line and an alternating current distribution line.

7. The communication system of claim 1 wherein the service node comprises a mobile switching center.

8. The communication system of claim 1 wherein the first antenna serves a first cell including the first wireless devices and the second antenna serves a second cell including the second wireless devices.

9. The communication system of claim 1 wherein the first base station and the second base station share a same elevated structure.

10. The communication system of claim 1 wherein the second site does not include the first base station, does not include the second base station, and does not include other base stations.

11. A method of operating a communication system, the method comprising:
   exchanging first user communications in a wireless communication format between first wireless communication devices and a first antenna located at a first site;
   exchanging the first user communications between the first antenna and a first base station located at the first site;
   exchanging the first user communications between the first base station and a service node;
   processing the first user communications in the service node to provide a communication service to the first wireless communication devices;
   exchanging second user communications in the wireless communication format between second wireless communication devices and a second antenna located at a second site;
   exchanging the second user communications between the second antenna and a first surface wave communication interface located at the second site;
   exchanging the second user communications over a surface wave communication link between the first surface wave communication interface at the second site and a second surface wave communication interface located at the first site, wherein the surface wave communication link transports the second user communications in communication signals external to and around the surface of an electrical power line a guided Radio Frequency (RF) wave;
   exchanging the second user communications between the second surface wave communication interface at the first site and a second base station located at the first site;
   exchanging the second user communications between the second base station and the service node; and
   processing the second user communications in the service node to provide the communication service to the second wireless communication devices.

12. The method of claim 11 further comprising, at the first site, aggregating the first user communications and the second user communications onto a same communication link between the first site and the service node.

13. The method of claim 11 further comprising, at the first site, de-coupling the first base station from a faulty communication link to the service node and coupling the first base station to an operating communication link to the service node.

14. The method of claim 11 further comprising, at the first site, de-coupling the second base station from a faulty communication link to the service node and coupling the second base station to an operating communication link to the service node.

15. The method of claim 11 further comprising, at the first site, de-coupling one of the base stations from a faulty communication link to the service node and coupling the one base station to an operating communication link used by the other base station to communicate with the service node.

16. The method of claim 11 wherein the power line comprises at least one of a neutral line and an alternating current distribution line.

17. The method of claim 11 wherein the service node comprises a mobile switching center.

18. The method of claim 11 wherein the first antenna serves a first cell including the first wireless devices and the second antenna serves a second cell that includes the second wireless devices.

19. The method of claim 11 wherein the first base station and the second base station share a same elevated structure.

20. The method of claim 11 wherein the second site does not include the first base station, does not include the second base station, and does not include other base stations.

* * * * *

UNITED STATES PATENT AND TRADEMARK OFFICE
CERTIFICATE OF CORRECTION

PATENT NO.       : 7,590,404 B1
APPLICATION NO.  : 11/132003
DATED            : September 15, 2009
INVENTOR(S)      : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this

Twenty-first Day of September, 2010

David J. Kappos
*Director of the United States Patent and Trademark Office*